United States Patent Office 3,420,925
Patented Jan. 7, 1969

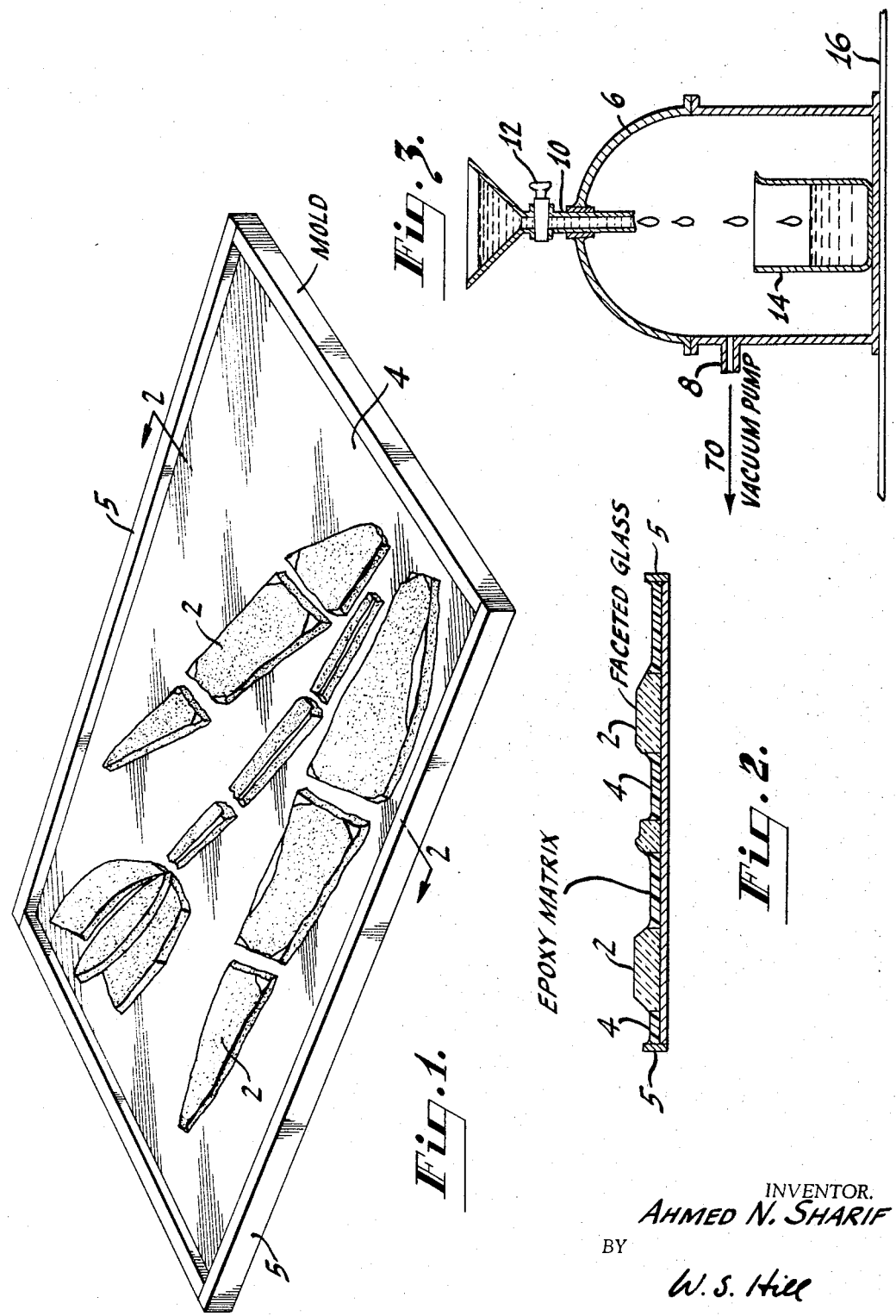

3,420,925
METHOD OF FABRICATING A PANEL
Ahmed N. Sharif, Lake Shore Drive S., R.D. 2,
Dover, N.J. 07801
Filed June 21, 1966, Ser. No. 559,206
U.S. Cl. 264—102                                    5 Claims
Int. Cl. B29b 3/00

ABSTRACT OF THE DISCLOSURE

Method of fabricating a decorative or structural panel, a substantial proportion of which comprises a synthetic resin of the type which hardens by reaction with a curing agent which is mixed with the resin while it is still in a pourable state, and which may also contain varying amounts of particulate fillers, comprising preparing mixture of uncured resin and filler, also a separate quantity of curing agent, mixing the two components, and permitting the resulting mixture to fall in successive small quantities through a vacuum to remove air and other gases normally entrapped therein, and then casting a panel from the de-aerated mixture.

---

This invention relates to an improved method of fabricating a decorative or structural panel, and, more particularly, to an improved method of making a panel of the type which may comprise an array of relatively thick pieces of faceted glass or other material arranged in a desired pattern embedded in a matrix which includes an epoxy or similar type resin. The panel may also comprise substantially all resin with no embedded matter.

In the past, churches, public buildings and other structures have made widespread use of stained glass windows and panels to achieve decorative effects by light transmission. These windows and panels have usually been made of colored glass pieces glazed with lead strips, and their success is evidenced by their long continued popularity.

However, it has also been recognized that conventional stained glass windows have certain disadvantages. They exhibit relatively low impact strength and rather high flexibility rather than strength and rigidity. They also have rather high heat losses. In addition, the glass units are relatively low in refractive qualities. More recently, conventional stained glass windows have had their surfaces, which would normally be exposed to the weather, covered with an outer panel of clear protective glass which further decreases the refractive properties and also adds considerably to the installation cost.

The desire for a decorative window having greater structural strength and more brilliance has been partially met by employing one-inch thick pieces of colored slab glass embedded in a matrix of concrete. However, to achieve a sufficient degree of waterproofness and to compensate for the rather poor adhesion between the glass and the concrete it has been found necessary to use a one-inch thickness of concrete as the matrix and thus the matrix is as thick as the glass itself.

With use it has been found that such windows having a concrete matrix are neither as waterproof nor as durable as desired. The concrete weathers and develops cracks, requiring frequent repair. Attempts have been made to partially solve the problem by coating the concrete surface with various waterproofing agents and protective outer panels of glass have also been employed. Another great disadvantage of windows having a concrete matrix is that they are relatively heavy and require heavy fenestration.

The aforementioned problems and disadvantages of the concrete type matrix have directed attention to a matrix made of epoxy or other similar resin composition. This substitution has permitted a reduction in matrix thickness to one-half inch with a considerable reduction in weight, an improved resistance to moisture penetration and weathering and, what is of at least equal importance, a considerable increase in light-refracting properties due to the fact that the one-inch thick glass can be faceted.

Problems have still remained, however, with the epoxy resin type matrix. It frequently has an excess of bubbles and other defects which have been found to be due to the presence of air in the cured matrix. The bubbles have introduced a relatively high degree of porosity and, when exposed to constant temperature changes, the expansion and contarction of the bubbles or water entrapped therein has introduced cracks and fissures that may eventually cause complete failure of the cracked portions.

One object of the present invention is to provide an improved method of making faceted glass, light-transmitting panels of the type utilizing catalyst-hardenable resins as the sealing and embedding material.

Another object of the invention is to provide an improved faceted glass, light-transmitting panel of the type wherein the pieces of glass are embedded in a matrix of deaerated resin composition which is more resistant to weathering than previously used compositions.

A further object of the invention is to provide an improved decorative or structural panel, with or without embedded pieces of faceted glass or like materials, that is simple and economical to fabricate but which is highly resistant to weathering and cracking when exposed to the atmosphere for long periods of time.

A still further object of the invention is to provide an improvd light-transmitting decorative panel of the type comprising pieces of faceted glass embedded in a matrix of a catalyst-hardenable resin wherein the matrix is substantially void-free when cured and is of improved strength resistance to weathering.

The improved results of the present invention are based on the improved method of the invention which comprises an improved way to remove entrapped gases from matrix compositions while they are still in the fluid or pourable state. The matrix compositions essentially comprise a synthetic resin that can be hardened to form an infusible material in the presence of a suitable catalyst, and the catalyst, itself. Other ingredients, such as opacifying fillers and coloring agents, may also be present. In the method of the invention, these ingredients are mixed, and while the compositions are still in the pourable state, the mixture is permitted to fall dropwise, or in a thin stream, into an evacuated chamber, where the entrapped gases are quickly and substantially completely removed. The de-aerated composition is then used to embed pieces of faceted glass in a mold, or to manufacture solid plain panels without embedments.

Although the examples which follow are directed to the fabrication of faceted glass panels, the method of the invention is also applicable to making panels wherein other materials, such as ceramics, are substituted for the glass or where nothing is embedded in the matrix.

In the drawing:

FIGURE 1 is a perspective view of a faceted glass panel made with resin compositions treated in accordance with the method of the present invention;

FIGURE 2 is a section view taken along the line 2—2 of FIGURE 1; and

FIGURE 3 is a schematic section view of simple apparatus which may be utilized in carrying out the improved method of the invention.

FIGURE 1 is an example of a type of decorative panel as made by the improved method of the present invention. It comprises faceted pieces 2 of slab glass spaced apart and set in a matrix 4 of a hardened synthetic resin. The pieces of glass may be of different colors and shapes and arranged in a desired pattern. They are preferably substantially thicker than the resin matrix so that their tops protrude above the surface of the matrix. If the pieces of glass are clear and the matrix is opaque, light transmitted through the faceted pieces is refracted, imparting a high degree of brilliance to the design.

Panels, such as that illustrated, are usually fabricated as follows. A design is created and sketched and a tracing made with the glass pieces which are to be included, outlined. The pieces are then cut from one-inch slabs of glass and faceted with hammer and chisel or other tools. The tracing is coated with a mold release and the glass pieces are laid upon it in their proper places. A disposable frame forming the mold sides is placed around the sketch and is clamped in place.

The matrix composition is then prepared. This comprises a two-component system. One component is composed of a catalyst-hardenable resin, or resins, modifiers and filler. The resins which are preferred are epoxy resins of the epichlorohydrin-bisphenol-A type that harden into infusible material at room, or slightly above room, temperature by reaction with a catalyst curing agent. The curing agent may be an acid, an amine or another resin. The modifiers may be plasticizers, stabilizers, flexibilizers, coloring agents or the like. The filler may be an opacifier such as quartz sand. The other component is the catalyst.

An example of a specific composition that may be used in the method of the present invention is as follows:

Component A—100 parts by weight of medium viscosity epoxy resin as described above (a typical example is a diglycidyl ether-bisphenol A. The epoxy resins which are preferred are those having average molecular weights of 350–400; epoxide equivalents of 175–250; and a viscosity at 25° C. of 3,000 to 15,000 poises); 100 parts by weight of dry sand.

Component B—10 parts by weight triethylenetetramine. Conventional modifiers may be incorporated to obtain specific physical properties and to control the coefficient of thermal expansion, flexural and impact strength. Other primary aliphatic polyamines can be used. Another example is diethylene triamine.

Various anhydrides can also be used as catalyst curing agents. An example is tetra-hydro-phthalic anhydride. This type of curing agent is useful in a two-step curing process, i.e., one in which the resin is partially cured at a low temperature and then, later, completely cured by being subjected to a higher temperature.

The two components are thoroughly mixed, first separately and then together. In the past, it has been found practically impossible to avoid mixing in air when the ingredients are blended. And when, as in past methods, attempts are made to remove entrapped air by placing the mixture in a hermetic chamber and applying vacuum, the liquid foams, froths and considerable of the entrapped air remains behind. The success of the improved method of the present invention is due largely to the particular way that has been devised to remove the entrapped air so that it is more completely removed from the mixture.

The improved method involves the use of simple and inexpensive apparatus as illustrated in FIGURE 3. This apparatus comprises a vacuum chamber 6 connected to a vacuum pump (not shown) through a line 8, a funnel 10, with stockcock 12, and a collecting container 14 mounted on a platform 16.

The vacuum chamber is pumped down to a vacuum of about 0.01 mm. of mercury with the funnel stopcock closed. Meanwhile, in the matrix composition mixture, which has been mixed just prior to use, the catalyst initiates or accelerates an exothermic chemical reaction that generates gases. The reacting materials are poured into the funnel and the flow of the mixture into the vacuum chamber is regulated by the stockcock. The stopcock is opened sufficiently to permit the mixture to fall through the vacuum chamber and into the collecting container as individual drops or as a thin stream. As the fluid drops through the vacuum chamber into the container, entrapped air and other gases are effectively and quietly removed while the catalyzing reaction is taking place.

The fluid mixture is thus treated in small batches and either removed from the vacuum chamber and poured into the mold 5, or the mold may be placed within the vacuum chamber to receive the matrix composition directly.

One of the advantages of the improved method is that now the ingredients of the matrix composition can be thoroughly mixed without regard for the entrapment of air that normally occurs during the mixing operation since the air is substantially completely removed during the vacuum treatment. Also the use of air-containing fillers is permitted since this air will also be removed. Another advantage is that with the more complete removal of entrapped gases there is little or no bubble formation and consequently much less tendency of the matrix to develop cracks with temperature changes.

Another advantage that is a complete departure from previously-used methods is that a mold can be placed within the vacuum chamber and the de-aerated matrix mixture can be cast directly in the mold. There is thus no chance for the mixture to regain more air between the time it has been de-aerated and the time it is poured into the mold. More than one set of funnels, stopcocks and pipes may be used for simultaneous or successive de-aerating. The multiple arrangement is desirable when casting is done in vacuum to allow the de-aerated mixture to fall into different parts of the mold.

Still another advantage is that in the improved method of the invention the resin-catalyst mixture is used as a vacuum sealant to prevent outside air from entering the chamber through the stem of the funnel.

The method is equally applicable in the making of various types of decorative and structural panels. In addition to making the type in which the matrix is opaque and the glass clear, it is also just as useful in making the type in which the matrix is clear and the embedded pieces are either clear or opaque. Also the embedded pieces need not be glass. They can be marble, for example. When the matrix composition is de-aerated as in the present invention, there is improved adhesion between the matrix and the embedded pieces.

What is claimed is:

1. A method of fabricating a decorative or structural panel, a substantial portion of which comprises a synthetic resin of the type which hardens by reaction with a curing agent mixed with the resin while the resin is in a pourable state, said method comprising preparing a quantity of a first component of a casting composition by thoroughly mixing together a quantity of an uncured resin and a particulate filler, preparing a quantity of a second component which includes sufficient catalyst to cure said uncured resin, thoroughly mixing sufficient of said first and second components to form a batch, said mixture normally having gases entrapped therein, and, while the mixture is in the pourable state, permitting successive small quantities thereof to pass through an evacuated space a sufficient distance to remove substantially all of said entrapped gases and, immediately thereafter, casting said panel from said de-aerated mixture.

2. A method according to claim 1 in which said panel is cast outside of said evacuated space.

3. A method according to claim 1 in which said panel also includes a patterned array of pieces of faceted slab glass, or the like, embedded in said resin.

4. A method according to claim 1 in which said mixture is permitted to fall dropwise through said evacuated space.

5. A method of fabricating a decorative or structural panel which comprises arranging a patterned array of pieces of faceted slab glass, or the lie in a shallow mold, preparing a resin-catalyst mixture in which said resin is of the type which hardens by reaction with said catalyst, and, while said mixture is still in the pourable state, permitting successive small quantities thereof to fall freely through a vacuum chamber to remove substantially all gases which may have been entrapped therein and, under ordinary atmospheric conditions, filling the mold around said pieces with the de-aerated mixture.

References Cited

UNITED STATES PATENTS 3,312,761   4/1967   Vida _____ 264—219

FOREIGN PATENTS 801,182   9/1958   Great Britain.

JULIUS FROME, *Primary Examiner.*

JEFFREY R. THURLOW, *Assistant Examiner.*

U.S. Cl. X.R.

264—225